United States Patent [19]

Ferri et al.

[11] 4,090,857
[45] May 23, 1978

[54] FILTER BOX FOR TEXTILE MACHINES, ESPECIALLY A SPINNING MACHINE

[75] Inventors: Johann Walter Ferri; Hanspeter Sutter, both of Uster, Switzerland

[73] Assignee: Luwa AG, Zurich, Switzerland

[21] Appl. No.: 716,173

[22] Filed: Aug. 20, 1976

[30] Foreign Application Priority Data

Aug. 25, 1975 Switzerland .................. 10942/75

[51] Int. Cl.² .............................................. B01D 50/00
[52] U.S. Cl. ...................................... 55/337; 55/338; 55/431; 55/472; 55/482
[58] Field of Search .................. 55/323, 337, 338, 417, 55/431, 466, 472, 482, 282, 301, 288; 57/34.5; 209/144

[56] References Cited

U.S. PATENT DOCUMENTS

| 849,641 | 4/1907 | Sadler | 55/417 |
|---|---|---|---|
| 1,505,744 | 8/1924 | Stebbins | 55/337 |
| 1,720,702 | 7/1929 | Streun | 55/417 |
| 1,856,685 | 5/1932 | Anderson | 55/338 |
| 2,203,776 | 6/1940 | Danils | 55/482 |
| 3,535,854 | 10/1970 | Taylor | 55/338 |
| 3,618,303 | 11/1971 | Nagel | 55/337 |
| 3,898,065 | 8/1975 | Coffman | 55/301 |

FOREIGN PATENT DOCUMENTS

| 352,081 | 4/1922 | Germany | 55/431 |
|---|---|---|---|
| 6,077 of | 1903 | United Kingdom | 55/338 |
| 885,344 | 12/1961 | United Kingdom | 55/337 |

Primary Examiner—William A. Cuchlinsky, Jr.
Assistant Examiner—David L. Lacey
Attorney, Agent, or Firm—Werner W. Kleeman

[57] ABSTRACT

A filter box for textile machines, especially spinning machines, comprising a filter subdividing a box into a raw air chamber and a clean air chamber, and a respective inlet opening and outlet opening communicating or connected with the raw air chamber. A ventilator is connected at its suction side with the clean air chamber. The filter possesses a cylindrical form and the inlet opening is formed by an inlet connection extending approximately tangentially with respect to the filter, in order to produce a spin flow in the raw air chamber.

6 Claims, 7 Drawing Figures

FILTER BOX FOR TEXTILE MACHINES, ESPECIALLY A SPINNING MACHINE

BACKGROUND OF THE INVENTION

The present invention relates to a new and improved construction of a filter box for textile machines, especially spinning machines, which is of the type comprising a filter subdividing a box into a raw air chamber and a clean air chamber, a respective inlet opening and outlet opening is provided for the raw air chamber, and a ventilator connected at its suction side with the clean air chamber.

With such type filter boxes the inlet opening is connected with a suction conduit servicing the working positions of the machine, whereas the outlet opening, as a general rule, is in communication with a central fibre depositing system which, through the agency of suitable lines or conduits where there prevails a negative pressure, coacts with a multiplicity of filter boxes. The fibres collected in the filter box at the raw air side are removed by means of the outlet opening due to the negative pressure in the central fibre depository, by periodically opening the shutoff element.

With the state-of-the-art filter boxes the filter, separating the raw air chamber and the clean air chamber from one another, extends practically transversely with respect to the direction of the flow produced by the ventilator. Consequently, most of the fibres reaching the raw air chamber deposit on the filter. With increasing time of operation and increasing contamination of the filter surface with fibres, the pressure drop at the filter increases and the suction capacity at the working locations of the machine accordingly decreases. It is therefore necessary to rather frequently clean or empty the filter boxes. Hence, the air conveying device which generates the negative pressure in the conduits of the fibre depositing system must be designed to be relatively efficient. Thus, the heretofore known filter boxes not only require considerable investment costs but, due to the energy requirement, also high operational costs.

In certain instances the pressure fluctuations in the suction conduit or line also can be disadvantageous for the operation of the machine or even the quality of the product. On the other hand, the utilization of such filter boxes may be impossible for certain applications, if, for instance, as in the case of open-end spinning there is required an absolutely constant pressure.

SUMMARY OF THE INVENTION

It is therefore a primary object of the present invention to provide a new and improved construction of filter box for textile machines, especially spinning machines, which is not associated with the aforementioned drawbacks and limitations of the prior art constructions.

Another and more specific object of the present invention aims at achieving approximately constant pressure in the suction system by preventing a coating of the filter with fibres.

Now in order to implement these and still further objects of the invention, which will become more readily apparent as the description proceeds, the filter box of the present development is manifested by the features that the filter or filter sieve has an approximately cylindrical shape and the inlet opening is formed by an inlet connection or stud which extends approximately tangentially with respect to the filter, in order to produce a spin flow in the raw air chamber.

By means of the spin flow which wipes the filter there is achieved the beneficial result that the fibres, which come into contact with the filter, are moved along the filter surface. Hence, these fibres cannot deposit upon this surface, and thus, it is possible to maintain at the filter a constant pressure drop.

According to a preferred embodiment of the inventive filter box there is provided a settling chamber or compartment between the raw air chamber and the outlet opening for the separated fibres. The settling chamber is separated from the raw air chamber in a manner such that separated fibres can no longer be entrained by the flow prevailing in the raw air chamber. In order to accelerate the removal and the settling operation of the separated fibres there also can be utilized, according to the invention, a branch or partial current of the raw air as the transport means and this transport air is withdrawn from the settling chamber into the raw- or clean air chamber.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
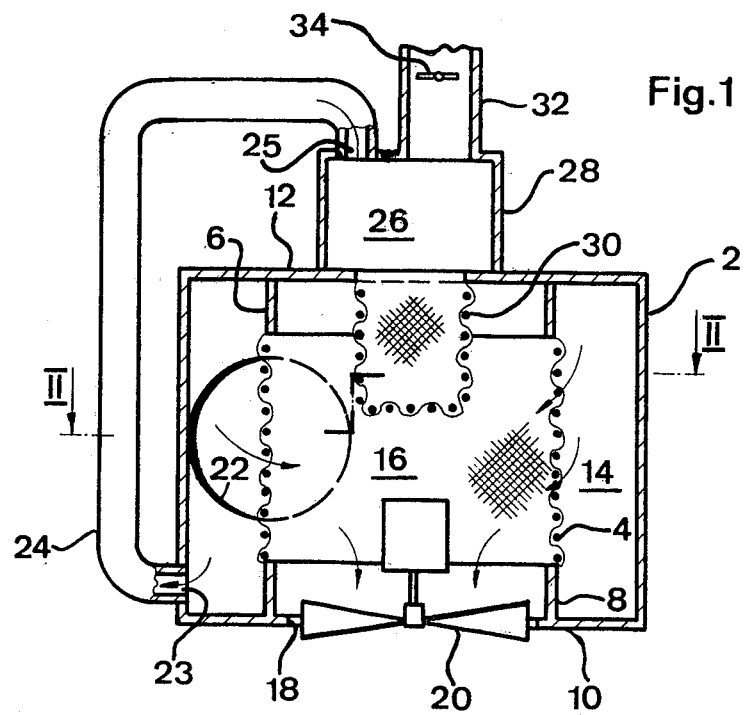
FIG. 1 is a vertical sectional view of a first exemplary embodiment of filter box intended for use with a spinning machine.
Figure 2:
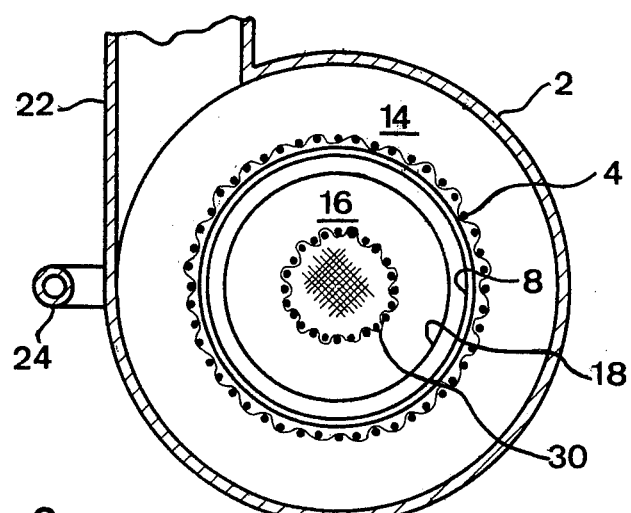
FIG. 2 is a sectional view of the filter box of FIG. 1, taken substantially along the line II — II thereof.

Referring now to the drawings, reference numeral 2 designates, in FIGS. 1 and 2, an approximately cylindrical housing which is provided internally thereof with a substantially cylindrical filter 4. The filter 4, together with cylindrical flanges 6 and 8 concentrically provided at the housing floor 10 and the housing cover 12, subdivides the interior of the housing 2 into a raw air chamber or compartment 14 and a clean air chamber or compartment 16.

A ventilator 20 is operatively associated by means of its suction side with an outlet or an exit opening 18 provided in the clean air chamber 16. Opening approximately tangentially with respect to the filter 4 into the annular-cylindrical raw air chamber 14 is an inlet connection or stud 22 which is operatively connected with a collecting line or conduit (not shown). This collecting line or conduit, which for instance extends in a conventional manner along the spinning machine, is connected with the suction openings or lines associated with the working positions of the machine.

At the outer periphery of the raw air chamber 14, bounded by the housing 2, there is connected at location 23 a connection pipe or conduit 24 which opens at location 25 into a settling chamber or compartment 26. This settling chamber 26 is formed, on the one hand, by means of a cylindrical pot or container 28 seated coaxially upon the cover or cover member 12 and, on the other hand, by a likewise coaxial, cylindrical filter head 30 which extends into the clean air chamber 16. Connected with the pot or container 28 of the settling chamber 26 is a transport line or conduit 32 which can be shutoff by means of a flap member 34 or equivalent structure.

A ventilator (not shown) is operatively connected with its suction side to the transport conduit 32. When flap member 34 is opened, this ventilator removes the fibres collected in the settling chamber.

During operation of the filter box the transport air charged with fibre material and drawn into the collecting conduit by the action of the ventilator or fan 20 is transported by means of the connection 22, into the raw air chamber 14. Owing to the tangential arrangement of the connection 22 with respect to the raw air chamber as well as the action of the ventilator 20 which is continuously in operation, there is formed within the raw air chamber 14 a spin flow which is directed towards the floor 10. Since a lower pressure prevails in the clean air chamber 16 in relation to the raw air chamber 14, some of the transport air continuously penetrates through the filter 4. On the other hand, the fibres, from which there is separated the transport air upon passage through the filter, slide along a helical-shaped path on the filter surface.

The flow velocity of the transport air, upon entry into the raw air chamber 14, is chosen such that there is effectively prevented any adherence of fibres to the surface of the filter 4. Under the action of the centrifugal force the heavier fibre material, for instance in the form of balls or entanglement, in any case is propelled along the inner wall of the housing and does not come into contact with the filter.

But also as to the material deposited at the filter surface the force acting in the tangential direction is sufficient in order to displace the fibres along such surface. The fibres which have been practically completely separated from the transport air collect at the neighborhood of the floor 10.

Due to the spin flow there prevails internally of the housing 2 a pressure which drops from the outside towards the inside. The pressure prevailing at the center of the housing or the clean air chamber is also effective at the settling chamber 26. Consequently, a pressure drop exists between the opening 23 in the raw air chamber 14 and the mouth 25 of the conduit 24 at the point of opening into the settling chamber, this pressure drop causing a flow out of the raw air chamber into the settling chamber. The fibres reaching the neighborhood of the opening 23 are thus entrained by the flow through the conduit 24 and transported into the settling chamber 26. Due to the connection between the settling chamber 26 and the interior of the filter box through the agency of the filter head 30, i.e. the clean air chamber 16, there is formed an air return for that transport air which conveys the fibres out of the raw air chamber 14 via the conduit 24 into the settling chamber 26.

By opening the flap 34 for the purpose of emptying the settling chamber 26 the pressure conditions in the filter box are only slightly changed and the suction operation of the collection conduit and the filter box is not impaired.

Figure 3:
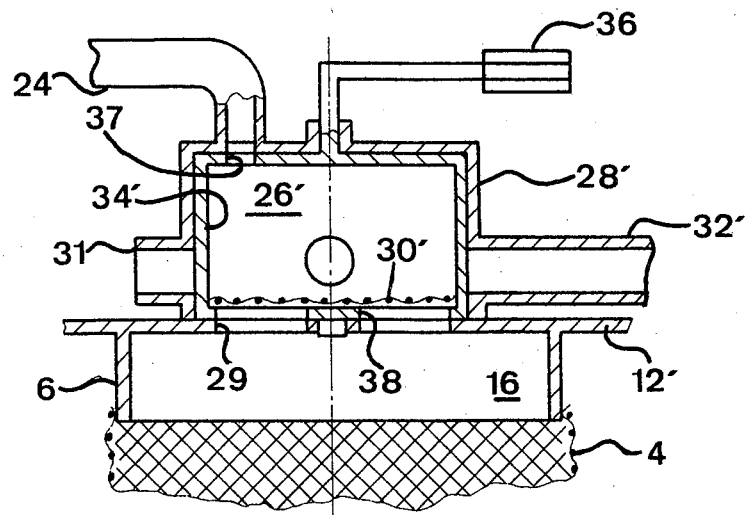
FIGS. 3 and 4 are fragmentary vertical sectional views of a modification of the filter box according to the first exemplary embodiment, showing two positions of a switching or reversing element.
Figure 4:
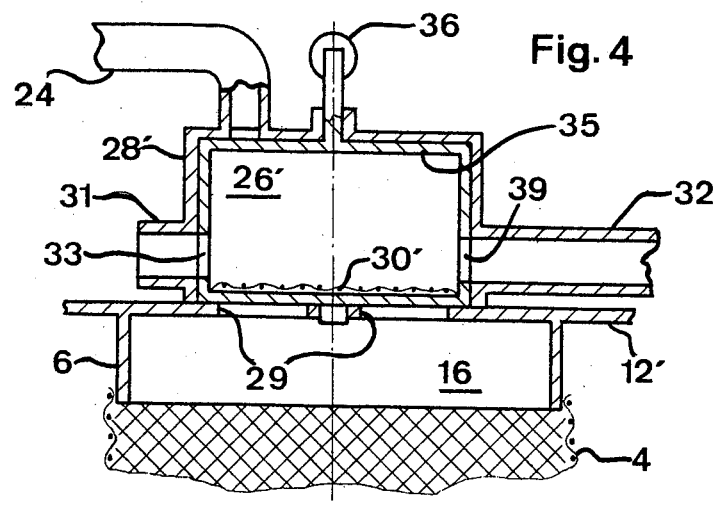

The filter box illustrated in FIGS. 1 and 2 is then suitable for use with an OE-spinning machine, if such is modified in the manner shown for the embodiment of FIGS. 3 and 4.

With this variant constructional embodiment there is seated upon the cover 12' of the filter box housing 2, instead of the pot or container 28, a likewise cylindrical pot or container 28'. This pot or container 28' differs from the exemplary embodiment of FIGS. 1 and 2 in that it does not directly bound or delimit the settling chamber 26, but rather forms a housing for a rotary slide valve. Rotatably mounted in the pot or container 28' is a hollow rotary slide valve body 35 which internally contains the settling chamber or compartment 26'. The rotary slide valve body 35 is movable, by means of an actuation arm 36, between two positions which are offset through 90°, which have been indicated in FIGS. 3 and 4 respectively. Apart from the conduit or line 24 opening into the pot and the outlet opening formed by the connection 32' the same is provided with one or a number of flushing connections 31 (only one has been shown), which communicates with the atmosphere. Further, there are provided in symmetrical arrangement in the cover 12' two throughpass openings 29.

In the position of FIG. 3 of the rotary slide valve or rotary slide valve body 35, constituting a four-way valve, and which position corresponds to the normal operation of the filter box, the settling chamber 26' communicates via a bore 37 with the conduit 24 and via likewise symmetrical bores 38 as well as the throughpass openings 29 with the clean air chamber 16. Arranged forwardly of the bores 38 is the filter 30' which retains the arriving fibres in the settling chamber, while the transport air is permitted to flow-off into the clean air chamber.

In the emptying position of the rotary slide valve body 35, illustrated in FIG. 4, the settling chamber 26' is shutoff both with respect to the conduit 24 as well as also with respect to the throughpass openings 29. On the other hand, the flushing connection or connections 31 communicate via one or a number of flushing bores 33 (only one is illustrated) with the settling chamber 26', which in this position of the rotary slide valve body 35 is connected through the agency of an outlet bore 39 with the outlet connection 32'.

Under the action of the negative pressure in the central suction system connected with the connection or stud 32', air is drawn from the atmosphere by means of the connection or connections 31 and the bore or bores 33. Hence, in the settling chamber 26' there is formed a flow directed towards the outlet bore 39. The fibre material collected in the chamber 26' is accordingly withdrawn by means of the bore 39 and the connection 32'. The air flow which traverses the settling chamber 26', due to the arrangement of the bores 33 and 39, wipingly contacts the surface of the filter 30', so that the same is extensively cleaned of any adhering fibres.

The construction illustrated in FIGS. 3 and 4, otherwise having the same structure as the filter box of FIGS. 1 and 2, permits emptying of the settling chamber 26', without such emptying having any effect upon the pressure conditions in the raw air chamber or in the clean air chamber. The connections existing between the settling chamber 26' and the raw air chamber 14 and the clean air chamber 16 are completely shutoff. On the other hand, the separation of fibres from the air departing from the raw air chamber in the direction of the clean air chamber is not impaired by the emptying operation in the settling chamber, since the switching or reversal operation due to the rotary slide valve as well as also the cleaning due to the use of the flushing air, only requires very little time.

Figure 5:
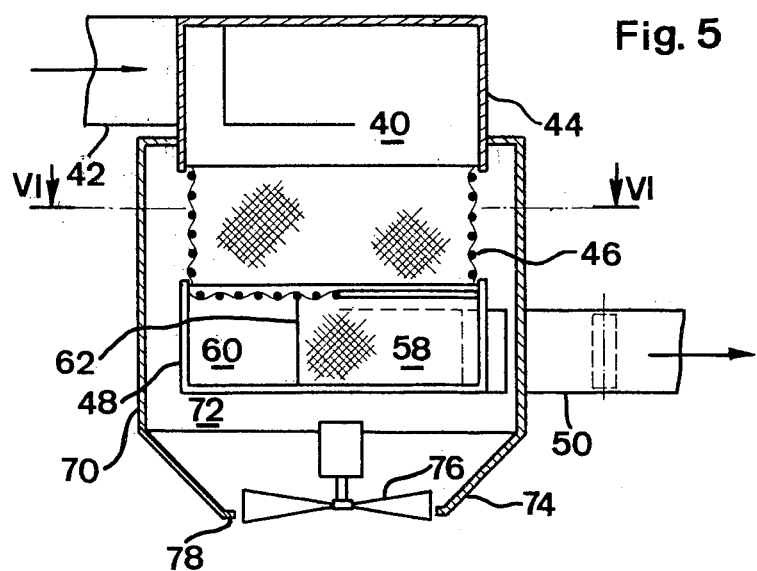
FIG. 5 is vertical sectional view of a second exemplary embodiment of a filter box.
Figure 6:
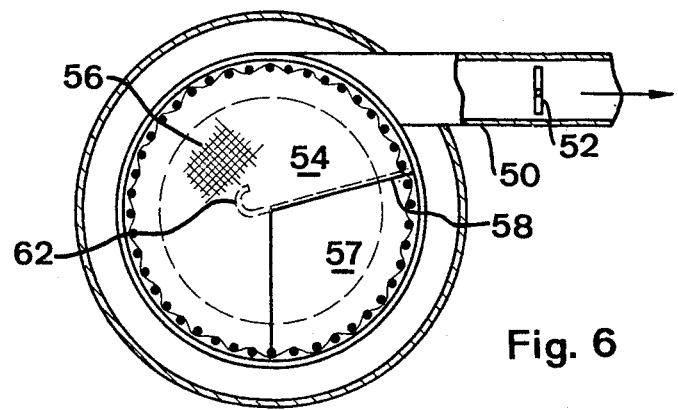
FIG. 6 is a cross-sectional view of the arrangement of FIG. 5, taken substantially along the line VI — VI thereof.
Figure 7:
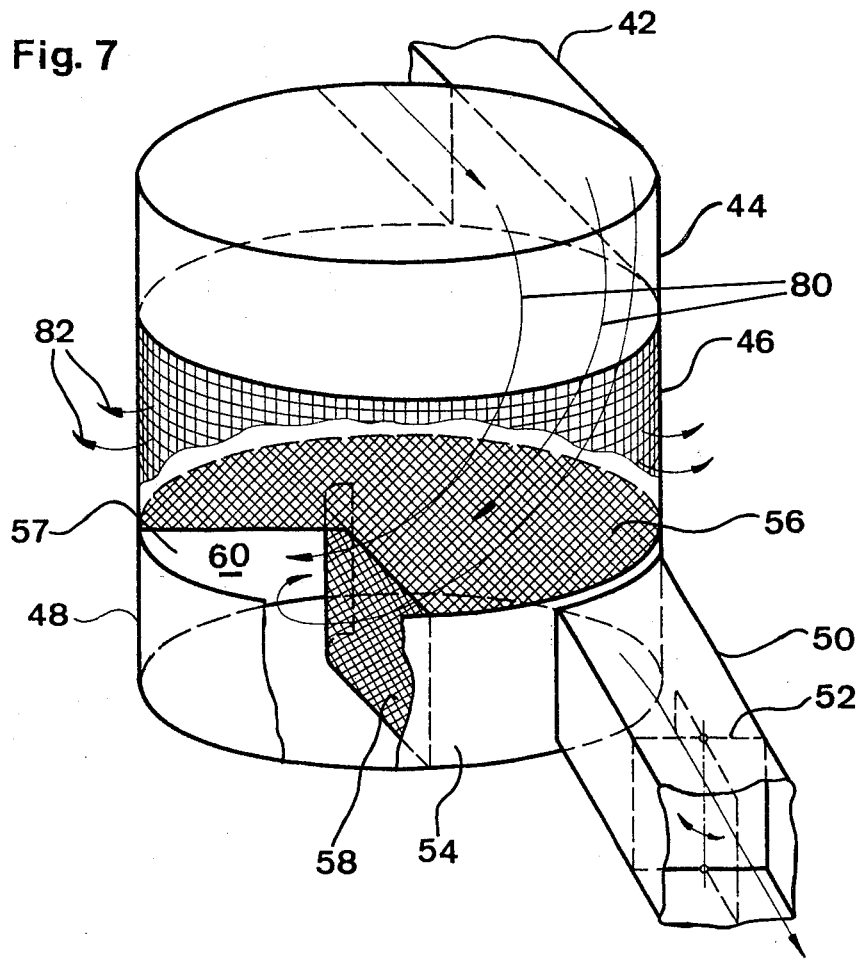
FIG. 7 illustrates in perspective view part of the filter box of FIG. 5.

The filter box illustrated in FIGS. 5 to 7 possesses an approximately cylindrical raw air chamber 40 into which tangentially opens an inlet connection or stud 42. A cylindrical filter 46 merges with the inlet housing 44 having the connection or stud 42. This filter extends downwardly to the region of an outlet housing designated by reference character 48. The outlet housing 48 possesses a tangential outlet connection 50 equipped with a shutoff flap 52 or equivalent structure. The outlet housing 48 contains a settling chamber 54 at a part thereof located in front of the outlet connection 50. The settling chamber 54 is partially separated, from the raw air chamber 40, by sieve- or filter surfaces 56 and 58 defining a partition element or means. The sieve surface 58 extends approximately in a radial plane of the outlet housing and leaves free a recess or opening 57 of about one quarter of the circular surface. The sieve surface 58, with the exception of a projection 62, extends in an axial plane and leaves free a throughpass opening 60 in the settling chamber 54.

An outer housing 70, which likewise is configured as a cylindrical body, surrounds the outlet housing 48 and the filter 46 in coaxial position and joins in an airtight manner at the inlet portion 44, in order to form a hollow cylindrical clean air chamber 72. The outer housing 70 possesses at its truncated cone-shaped end 74 which extends past the housing end 48, a central opening 78 with which there is operatively associated a ventilator 76. The outlet connection 50 flow communicates with a fiber depository of a central suction system (not shown).

During operation of the filter box according to FIGS. 5 to 7, air charged with fibres is drawn by means of the ventilator 76 through the connection 42 into the raw air chamber 40. Thus, due to the tangential arrangement of the connection 42 at the interior of the raw air chamber 40 there is formed a spin or twist flow in the direction of the arrows 80 of FIG. 7. The fibres contained in the flow are accordingly downwardly moved along a helical-shaped path at the filter surface 46, whereas air, as indicated by the arrows 82, moves through the filter 46 into the clean air chamber 72 and leaves such via the opening 78. The fibres together with the residual flow of the uncleaned air arrive through the opening 57 in the sieve surface 56 and the opening 60 in the settling chamber 54. During such time as the fibres are retained in this chamber by the sieve surfaces 56 and 58, the air from the residual flow can flow upwardly without hindrance. Since the filter- or sieve surfaces 46 and 56 are intensively flushed by the spin flow or residual flow, respectively, from the side of the raw air chamber, there occurs practically no deposition of fibres upon such surfaces. Hence, during operation of the filter box there is no change in the pressure gradient at the filter 46 and thus, there is also no change of the suction action at the machine serviced by the filter box.

In order to clean the settling chamber 54 the flap 52 is briefly and for instance periodically opened, so that there is formed therein a suction air-current which is directed towards the outlet connection. Thus, the fibres collected in the settling chamber are drawn up and delivered through the central suction system to the fibre depository. At the same time the sieve surfaces 56 and 58, which during normal operation function as air return means, are freed of fibres possibly adhering at the side of the settling chamber.

While there are shown and described present preferred embodiments of the invention, it is to be distinctly understood that the invention is not limited thereto, but may be otherwise variously embodied and practiced within the scope of the following claims. Accordingly,

What is claimed is:

1. A filter box for textile machines, especially spinning machines, comprising a box, a substantially cylindrical first filter arranged within the box and subdividing said box into a raw air chamber and a clean air chamber, means defining a respective raw air inlet opening and a fiber outlet opening connected to the raw air chamber, means providing a clean air outlet opening connected to said clean air chamber, a ventilator having a suction side connected to the clean air outlet opening, said raw air chamber having a substantially hollow cylindrical configuration and an inner wall, said first filter forming at least a part of the inner wall of the raw air chamber, the raw air inlet opening extending approximately tangentially with respect to the inner wall of the raw air chamber to produce a spin flow in the raw air chamber, a fiber settling chamber connected to the fiber outlet opening of the raw air chamber, air return means connected between the fiber settling chamber and the clean air chamber for returning air from the settling chamber to the clean air chamber, said air return means including a second filter through which passes the return air, a fiber exhaust means connected to said settling chamber for exhausting the fibers therefrom, and a shutoff means positioned in the fiber exhaust means for controlling the exhaust of fibers from the settling chamber.

2. A filter box for textile machines, especially spinning machines, comprising a box, a substantially cylindrical first filter arranged in said box and subdividing said box into a clean air chamber and a raw air chamber, said raw air chamber having an inner surface and comprising a substantially hollow cylindrical configuration surrounding said clean air chamber, said first filter forming at least a part of the inner surface of the raw air chamber, means defining a respective raw air inlet opening and a fiber outlet opening connected with the raw air chamber, means providing an exit opening for said clean air chamber, a ventilator having a suction side connected with the exit opening of said clean air chamber, the raw air inlet opening extending approximately tangentially with respect to the first filter to produce a spin flow in the raw air chamber, the fiber outlet opening being radially and axially spaced from said first filter and from said raw air inlet opening, a fiber settling chamber connected to the fiber outlet opening, air return means and fiber exit means connected with the fiber settling chamber, said air return means opening into the clean air chamber, a further filter interposed between the clean air chamber and the air return means, and a shutoff element means positioned in said fiber exit means for controlling the exit of fibers from said fiber exit means.

3. The filter box as defined in claim 2, further including at least one connection means between the raw air chamber and the settling chamber and the air return means, a respective shutoff element provided for each such connection means.

4. The filter box as defined in claim 3, wherein the shutoff element comprise a common rotary slide valve.

5. The filter box as defined in claim 4, wherein the rotary slide valve possesses a hollow rotary slide valve body containing therein the fibre settling chamber.

6. A filter box for textile machines, especially spinning machines, comprising a substantially cylindrical outer jacket and a substantially cylindrical inner jacket substantially coaxially arranged within said outer jacket, a partition element extending over part of the cross section of said inner jacket and subdividing said inner jacket into a raw air chamber and a fiber settling chamber, a free throughpassage in said partition element between the raw air chamber and the fiber settling chamber, raw air inlet conduit means connected with said raw air chamber and extending approximately tangentially with respect to said inner jacket to produce a spin flow in the raw air chamber, fiber outlet conduit means connected to said fiber settling chamber and having a shutoff element therein movable between an open and a closed position, a clean air chamber being formed between said outer jacket and said inner jacket, a circumferential portion of said inner jacket comprising a filter, means in said outer jacket defining an outlet opening for said clean air chamber, a ventilator having a suction side connected to the outlet opening of said clean air chamber, said partition element comprising a sieve means for retaining in said fiber settling chamber fibers transported by the spin flow through the free throughpassage into the settling chamber and for permitting at least part of the air to return into the raw air chamber through said sieve means when said shutoff element is in said closed position.

* * * * *